United States Patent [19]

Hagerman et al.

[11] Patent Number: 4,474,845

[45] Date of Patent: Oct. 2, 1984

[54] COMPACTED SHEET MOLDING COMPOUND

[75] Inventors: Edward M. Hagerman, Royal Oak; Harry A. Mitchell, Sterling Heights, both of Mich.

[73] Assignee: General Motors Corporation, Detroit, Mich.

[21] Appl. No.: 412,034

[22] Filed: Aug. 26, 1982

[51] Int. Cl.³ .................................................. B32B 5/16
[52] U.S. Cl. ........................................ 428/283; 156/62.4; 156/276; 264/175; 264/257; 264/280; 428/285; 428/290; 428/297; 428/323; 428/325; 428/402; 428/406; 428/407; 428/408; 428/902
[58] Field of Search ................. 428/74, 285, 287, 298, 428/299, 302, 280, 323, 283, 286, 290, 325, 402, 403, 406, 407, 408, 902; 264/174, 175, 210.2, 257, 258, 320, 324, 280; 156/62.2, 62.4, 276

[56] References Cited

U.S. PATENT DOCUMENTS

| | | | |
|---|---|---|---|
| 3,903,343 | 9/1975 | Pfaff | 428/285 |
| 4,065,597 | 12/1977 | Gillespie | 428/285 |
| 4,098,943 | 7/1978 | Degginger et al. | 428/285 |
| 4,201,823 | 5/1980 | Russell | 428/285 |
| 4,302,499 | 11/1981 | Grisch | 428/285 |
| 4,379,802 | 4/1983 | Weaver et al. | 428/285 |

Primary Examiner—James J. Bell
Attorney, Agent, or Firm—Elizabeth F. Harasek

[57] ABSTRACT

A method is provided for compacting viscous polymeric molding compositions preparatory to compression molding to substantially improve the physical properties of articles molded therefrom. Suitable compositions include those filled with a geometric reinforcing particulate filler that are flowable and thermosettable when compression molded. The method comprises forming a slab of a said filler composition and thereafter reducing its thickness by passing it between spaced-apart pairs of compression means. The pair members of the means are spaced apart to ultimately substantially reduce its thickness. The method yields unexpected improvements in the tensile strength, isotropy and surface characteristics of articles compression molded from the compounds.

10 Claims, 12 Drawing Figures

COMPACTED SHEET MOLDING COMPOUND

This invention relates to an improved method of processing viscous, fiber reinforced, thermosetting, polymeric compounds preparatory to compression molding. More particularly, the invention relates to a method of precompacting sheet or bulk molding compounds in order to improve their strength, isotropy, surface smoothness and receptivity to defect-free paint coatings.

BACKGROUND

Filler reinforced thermoset polymers are used in molding applications requiring high strength, lightweight, dimensional stability, and corrosion resistance. They are generally molded in matched die sets where heat and pressure are applied to simultaneously cure or crosslink the polymer constituents and shape the desired article. Such articles have frequently replaced assemblies of several stamped or cast metal parts.

Almost all of the thermoset polymer compositions now used in making reinforced plastic components contain crosslinkable polyester resins. However, other viscous resin systems based on polymers such as epoxies, phenolics, silicones, phthalates, polyurethanes, etc., are used where their special properties suit a particular application and may be employed in the practice of this invention.

Sheet molding compound (SMC) is generally defined as a composite molding material made up of an unsaturated polyester resin, a low profile thermoplastic polymer agent, an inert filler, a fibrous reinforcement, metal oxide maturation aids and processing aids. Generally, the unsaturated polyester resin is the reaction product of polypropylene oxide, phthalic anhydride and maleic anhydride. These constituents are typically provided in solution with styrene monomer. Low profile agents that include such thermoplastic polymers as polymethylmethacrylate, polyvinyl acetate or polybutadienestyrene copolymer rubber are added to improve surface smoothness. The inert filler is usually calcium carbonate, i.e., ground limestone. The fibrous filler is generally chopped fiberglass in roving lengths of about $\frac{1}{2}$ to 2 inches, each roving containing several hundred individual fibers loosely bound together by a starchlike binder.

SMC is generally made at a machine specifically designed for the purpose. A sheet of SMC is produced by applying a thin layer of a low viscosity mixture of resin-styrene monomer and the other ingredients onto a continuous, styrene-impermeable, carrier film of polyethylene or other suitable material. The glass fibers are then laid on top of the resin layer. A second layer of the resin mixture is applied over the fiberglass layer and a second protective film is laid on top of it. The resulting sandwich of resin and glass between protective carrier films is then carefully rolled to knead the glass fiber into the resin. This mixing action must be very gentle as the viscosity of the constituents is low at this time. Application of any substantial compression would cause the resin mixture to ooze out between the edges of the protective films.

The final step of SMC preparation is to coil the just-made compound into rolls, and allow them to maturate under controlled temperature conditions (preferably near room temperature, ~23° C.) for several days. SMC maturation is generally defined as the process in which the metal oxide constituents react with free organic acid groupings of the polyester constituent to thicken it. Maturation is allowed to proceed to a point where the viscosity of the material has increased to the extent that it can be readily handled for molding and the surface is not too tacky. While metal oxides and hydroxides are the predominant maturation agents, isocyanates are sometimes used as thickeners via a urethane reaction with the polyester component.

To compression mold maturated SMC, the protective films are first stripped from the compound. The resin-fiber composite, generally 2 to 8 mm in thickness, is then cut into suitably sized pieces and stacked into a "charge" of the proper geometry for a specific mold. The charge is placed into a matched metal die mold in a suitable compression molding press. Under typical molding conditions, a mold temperature of about 150° C. is maintained, a molding pressure of about 3.4 to 10.5 megaPascals is applied, and the article is cured in place for about 1 to 3 minutes.

Problems have been encountered in making reliable SMC parts for rigorous structural applications. For example, tensile strength measurements made on a large molded SMC panel may vary widely and unpredictably by location. Furthermore, the tensile strength of molded SMC parts tends to be anisotropic, the measured strength being higher in the direction of material flow in the mold. As a consequence, molded SMC parts may not be useful in applications where consistent and isotropic strength characteristics are required.

Another serious problem with compression molded SMC is a prevalence of microscopic surface defects in the form of small holes or pores at or near the surface of a molded part. These cannot be tolerated where a high quality painted surface is required. When paint is applied to a part and cured at an elevated temperature, outgassing from the pores creates pops and craters in the painted surface. Another prevalent problem where high gloss paints are applied is low distinctness of image. Distinctness of image (DOI) is a measurement of the resolution of images reflected from a glossy painted surface. Low DOI is generally caused by microscopic irregularity of the substrate or the paint itself. SMC, as molded, generally exhibits a less than desirable DOI. Another common problem with SMC parts is surface waviness which detracts significantly from the appearance of high gloss coatings.

Many attempts have been made to improve the physical properties and the surface characteristics of SMC by modifying the polymer chemistry, filler loadings and fiber reinforcements. Better surfacing can be achieved by incorporating a high proportion of low profile thermoplastic resin. However, this is relatively expensive and adversely affects the strength of the compositions. Relatively expensive pliable fiber fillers such as graphite can be substituted for chopped fiberglass but these provide only minimal improvements in tensile characteristics and surface appearance. The overall chemistry of SMC compositions can be changed, but each such change dictates extensive study and testing to assure that the new material is adequate for a particular application. Moreover, in most cases changing the chemistry or filler content of an SMC composition provides an improvement of only a few percent in either the surface characteristics or tensile properties.

OBJECTS

Accordingly, it is an object of the invention to provide a method of treating conventional fiberglass filled, maturated sheet molding compound to substantially improve the physical properties of an article molded from it as well as to provide a smoother and less porous surface. A more general object of the invention is to provide a method of treating a viscous, thermosetting, polymeric molding composition containing a geometric reinforcing particulate filler to substantially improve the physical properties of an article molded from it.

It is a particular object of the invention to improve the tensile properties of parts molded from such compounds in all directions in the plane of a part. Another object is to improve the surface characteristics of parts molded from such compounds so that they are substantially smoother and more receptive to glossy paint finishes than conventional filled thermoset plastics as compression molded. A more particular object is to provide a means of compacting thermoset plastics containing geometric reinforcing filler particles whereby the filler is better dispersed in the polymer resin. A more specific object is to reduce the thickness of a slab of fiberglass filled maturated sheet molding compound to substantially break up bundles of glass fibers into individual filaments and to wet these filaments with the resin constituents of the SMC. Another specific object of the invention is to disperse geometric fillers within a viscous molding composition so that they do not adversely affect the surface characteristics of a part compression molded therefrom.

Another object of the invention is to provide a means of treating a conventional sheet molding compound preparatory to molding to measurably and significantly improve its tensile properties and to provide such molding compositions with substantially isotropic properties when desired. Another object of the invention is to provide means for accomplishing the subject treatment. Another specific object of the invention is to provide a method of roll compacting sheet molding compound or bulk molding compound to incrementally reduce its thickness by an amount sufficient to accomplish improvements in tensile strength and surface characteristics.

Another object of the invention is to provide a means of molding a structural panel such as an automotive body panel to which a high gloss surface finish can be applied without sanding or otherwise radically pretreating the surface of the article preparatory to coating.

BRIEF SUMMARY

These and other objects may be accomplished in accordance with a preferred practice of our invention as follows.

A conventional polyester based sheet molding compound is formulated and deposited between protective polymer films as described in the BACKGROUND. It preferably contains a substantial weight percent chopped fiberglass bundles dispersed in the polymer resin. The SMC is allowed to maturate until it can be readily cut into workpieces without sticking to the cutting instrument. Pieces are cut from the maturated sheet material and the protective films are removed.

The key to the subject invention is reducing the thickness of the maturated SMC. The reduction may be accomplished, for example, by passing the workpiece between a cooperative pair of calender rollers where the separation between the rollers is reduced on each pass. We believe that this process of working the high viscosity maturated resin causes the fiberglass bundles to break up into individual filaments. The filaments are, in turn, dispersed evenly throughout the SMC polymer matrix.

The reduction in workpiece thickness also serves to wet individual glass fiber filaments with the resinous polymeric material. This establishes good bonds between the filler and the polymer in the molding step. These bonds in turn enhance the effectiveness of the reinforcing filler in articles molded from the compacted SMC.

We have discovered that rolling SMC during preparation before the onset of maturation does not provide the beneficial results we have accomplished by compacting maturated SMC in accordance with our invention. Precompacting maturated SMC has, however, provided unexpectedly remarkable improvements in the strength, isotropy and surface characteristics of compression molded parts. The degree and nature of these advantages will become evident from the detailed description which follows.

DETAILED DESCRIPTION

Our invention will be better understood in view of the Figures in which.

Figure 5:
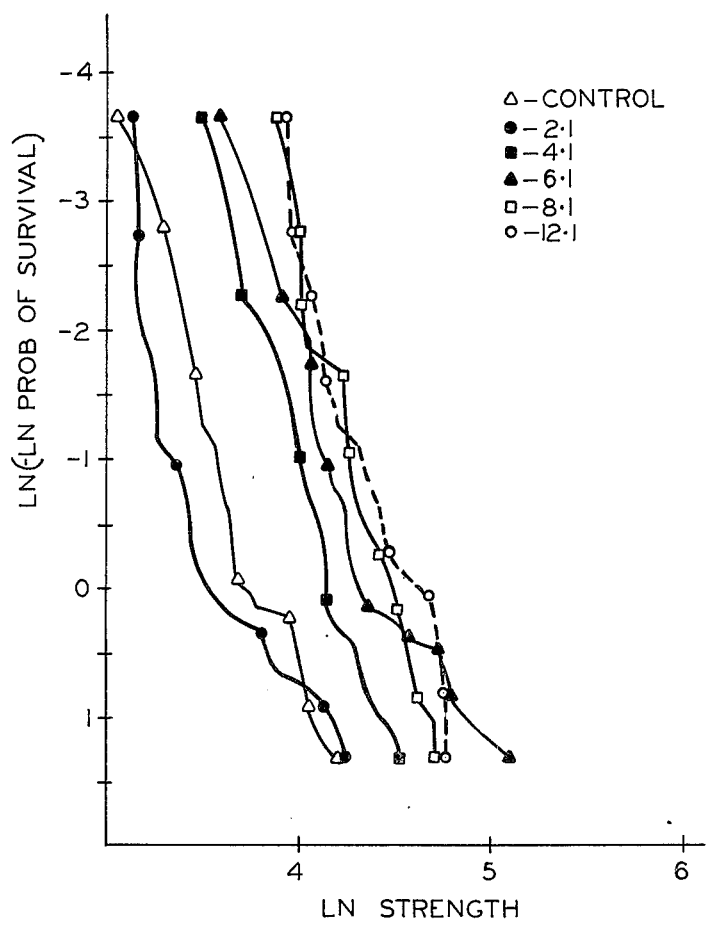

FIG. 5 plots the natural log of a Wiebull statistical probability for the survival of roll-compacted SMC samples as a function of the natural log of sample strength at several compaction ratios.

Figure 6:
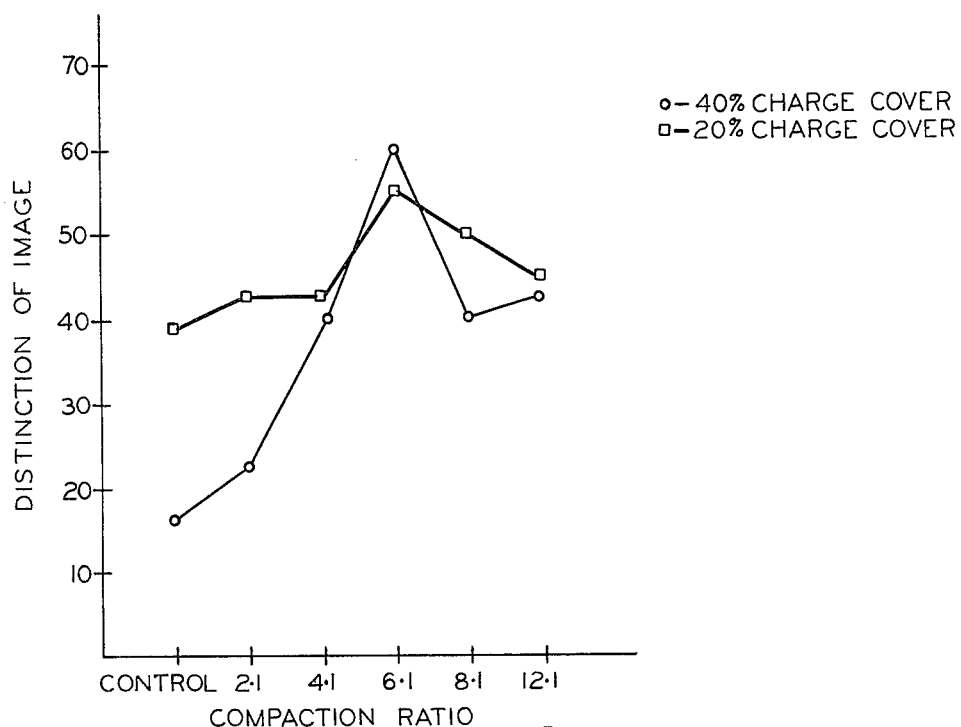

FIG. 6 is a plot of distinctiveness of image for a high gloss paint applied to SMC samples as a function of their compaction ratios.

Figure 7A:
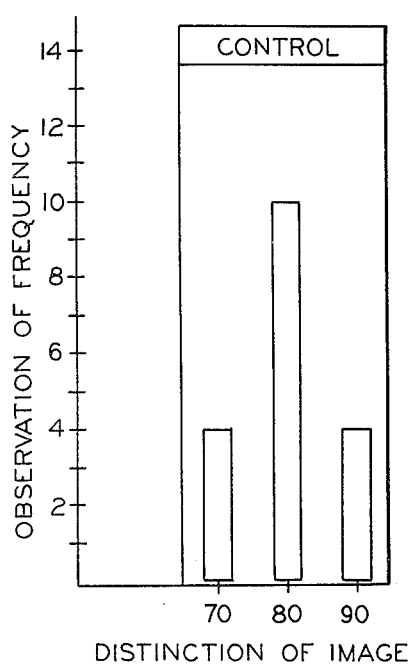
Figure 7B:
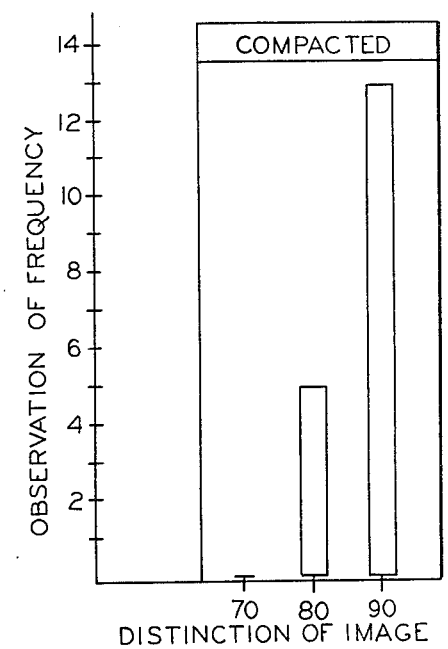

FIG. 7a is a bar graph of distinctness of image (DOI) observations for a conventional panel to which a high gloss paint has been applied, while FIG. 7b is a bar graph of DOI observations for a like panel molded from precompacted SMC.

Figure 8A:
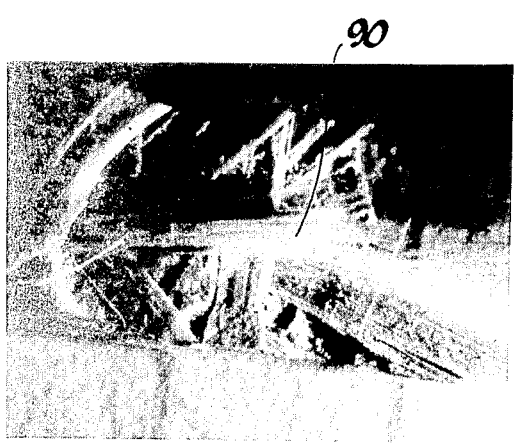
Figure 8B:
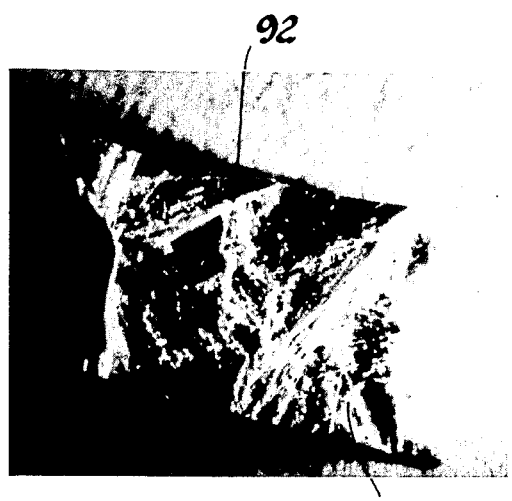

FIG. 8a is a photomicrograph of a fractured edge of a tensile specimen of conventional molded SMC, while FIG. 8b is a photomicrograph at like magnification of the fractured edge of a tensile specimen molded from the same SMC that was roll compacted in accordance with the invention.

Figure 9A:
Figure 9B:

FIGS. 9a and 9b are also photomicrographs of fractured edges of tensile specimen molded from conventional and compacted SMC, respectively, at greater magnification than FIG. 8.

The SMC compositions used in the following examples were all commercially available and the sheet material was made substantially as follows. All of the resinous and filler constituents (except the fiberglass) were combined and thoroughly mixed in a conventional mixing apparatus. At this point the resin mixture had a viscosity about equal to that of a thick pancake batter.

Figure 1:
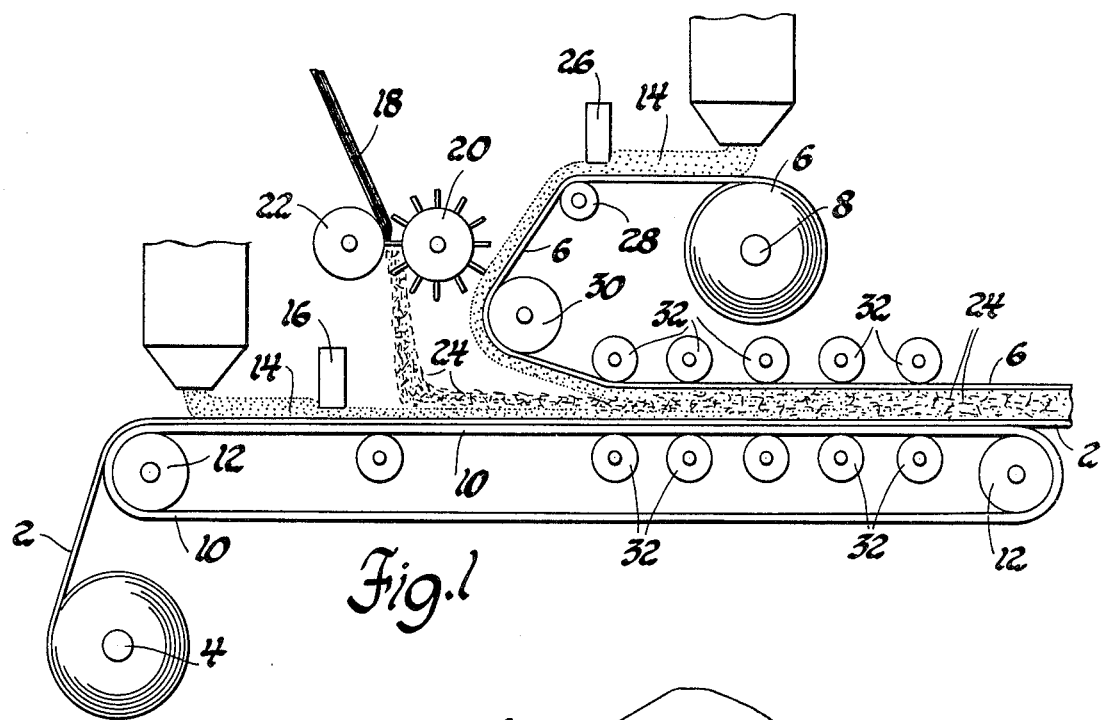
FIG. 1 is a schematic diagram of a conventional machine for making sheet molding compound.
Figure 2:
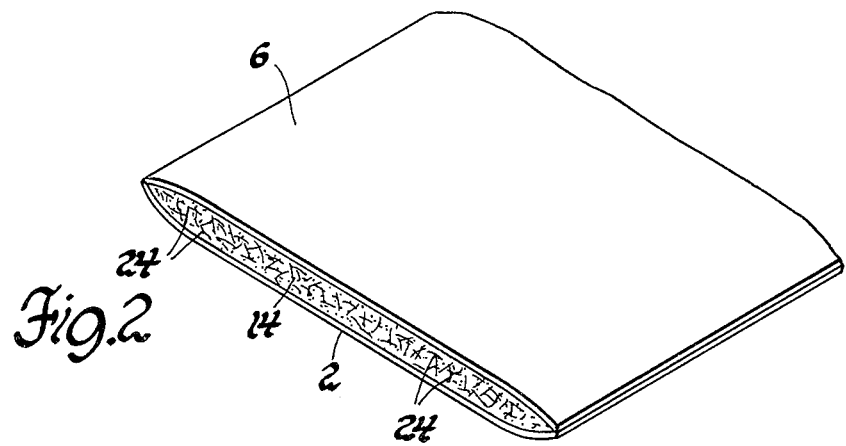
FIG. 2 is a perspective view of a slab of sheet molding compound as it appears before treatment in accordance with this method.

FIG. 1 is a schematic depiction of a typical machine for making SMC. Resin compound 14 is dispersed between a lower polyethylene film 2 played out from reel 4 and an upper polyethylene 6 film played out from reel 8. Film 2 is carried on lower endless belt 10 which travels around driven retainer rollers 12. A first layer of resin compound 14 is laid onto lower polyethylene sheet 2 and carried under doctor blade 16. Fiberglass rovings 18 are fed through a cutter comprising chopping wheel 20 and paten roller 22 where they are reduced to approximately 1 to 2 inch length pieces 24. Chopped fibers 24 fall onto the layer of resin 14 carried on lower polyethylene film 2. A second layer of the resin compound 14 is then deposited onto upper polyethylene sheet 6 and carried under doctor blade 26 around tensioning roller 28 and guide roller 30 to a first pair of nip rollers 32 where the SMC sandwich is formed. The SMC is then carried through several pairs of nip rollers 32 which even out the thickness of the sheet as formed. No substantial amount of pressure can be applied by these nip rollers or resin 14 will ooze out between polyethylene sheets 2 and 6. FIG. 2 shows a perspective view of an SMC "sandwich" made as above. The chopped glass fibers 24 are dispersed in resin 14 and the resin is covered by polyethylene sheets 2 and 6. The SMC sheet is rolled on a take-up reel (not shown) and set aside for maturation.

SMC made as above and used in the following examples was allowed to age at room temperatures for periods ranging from about 4 hours to about 30 days. Generally, SMC is allowed to maturate for about one week at room temperature (23° C.) or below before it is used. It may be stored longer, so long as provision is made to prevent evaporation of volatile constituents.

EXAMPLE I

SMC was prepared as described above using SMC Compound A, described in Table I.

TABLE I

| | SMC Compositions SMC Compound A | |
|---|---|---|
| Component | Trade Name | Weight Percent |
| Polyester Resin | Paraplex P340[a] | 16.8 |
| Low Profile Additive | Paraplex P701[a] | 9.2 |
| Low Profile Additive | Paraplex P543[a] | 2.4 |
| Catalyst | t-Butyl Perbenzoate | 0.16 |
| Catalyst | t-Butyl Peroctoate | 0.16 |
| Lubricant | Zn Stearate | 1.2 |
| Maturation Agent | MgO | 0.2 |
| Maturation Agent | CM 201[b] | 0.1 |
| Filler | Camel White (CaCO$_3$) | 44.7 |
| Glass Fiber - 25 mm ave. length | Owens-Corning Fiberglass 951 | 25.0 |
| | | 99.92 |

[a]Sold by Owens-Corning Fiberglas

The SMC had been allowed to maturate at room temperature for approximately 30 days at the time of roll compacting. Before treatment, the sheet was approximately 6.7 millimeters thick. Two specimen measuring 125×125 millimeters were cut from the compound and stripped of their protective films. These pieces were stacked together to provide a feed stock 13.4 mm thick.

Precompacting was carried out on a laboratory calender mill having two parallel, synchronously driven steel rollers 20.3 cm in diameter and 36.8 centimeters long. The mill was operated at a speed of approximately four revolutions per minute achieving a linear velocity of the SMC as it travelled through of about 255 centimeters per minute. The roll compacting was carried out at a room temperature generally about 23° C. The SMC was rolled between sheets of 4 mil thick polyethylene or 2 mil thick polypropylene, however, neither the thickness nor composition of suitable cover sheets is critical to the invention as they served primarily to prevent loss of volatiles during compaction. The sheets were changed during the rolling process as required to accommodate increasing width of the workpiece.

Table II sets out a typical undirectional roll compaction schedule for a sheet of maturated SMC done on the laboratory calender rolling apparatus described above. Fewer passes would be required on a compacting apparatus with larger rollers.

TABLE II

TYPICAL MILL SETTING FOR UNIDIRECTIONAL ROLL COMPACTION OF SMC SHEET

| PASS | MILL SETTING (mm) | SETTING REDUCTION (mm) | SMC THICKNESS (mm) | COMPACTION RATIO |
|---|---|---|---|---|
| 0 | — | — | 14.0 | |
| 1 | 12.7 | — | | |
| 2 | 12.1 | 0.6 | | |
| 3 | 11.4 | 0.7 | | |
| 4 | 10.8 | 0.6 | | |
| 5 | 10.2 | 0.6 | | |
| 6 | 9.5 | 0.7 | | |
| 7 | 8.9 | 0.6 | | |
| 8 | 8.3 | 0.6 | | |
| 9 | 7.6 | 0.7 | | |
| 10 | 7.0 | 0.6 | | |
| 11 | 6.3 | 0.7 | | |
| 12 | 5.7 | 0.6 | 6.7 | 2:1 |
| 13 | 5.1 | 0.6 | | |
| 14 | 4.4 | 0.7 | | |
| 15 | 3.8 | 0.6 | | |
| 16 | 3.2 | 0.6 | | |
| 17 | 2.5 | 0.7 | 3.4 | 4:1 |
| 18 | 2.2 | 0.3 | | |
| 19 | 1.9 | 0.3 | | |
| 20 | 1.7 | 0.4 | | |
| 21 | 1.4 | 0.3 | 2.3 | 6:1 |
| 22 | 1.1 | 0.3 | | |
| 23 | 1.0 | 0.1 | | |
| 24 | 0.9 | 0.1 | | |
| 25 | 0.8 | 0.1 | 1.8 | 8:1 |
| 26 | 0.6 | 0.2 | | |
| 27 | 0.5 | 0.1 | | |
| 28 | 0.4 | 0.1 | | |
| 29 | 0.3 | 0.1 | | |
| 30 | 0.1 | 0.2 | 1.0 | 12:1 |

By unidirectional compaction we mean a method in which the workpiece is fed between compacting rollers or other compacting means a plurality of times with the same lateral orientation (i.e., in the same direction) on each pass. Multidirectional compaction entails changing the orientation of the workpiece with respect to the compacting means during at least some of the passes. Parallel compaction is compaction in the direction in which the SMC was passed through the SMC making machine.

Figure 4:
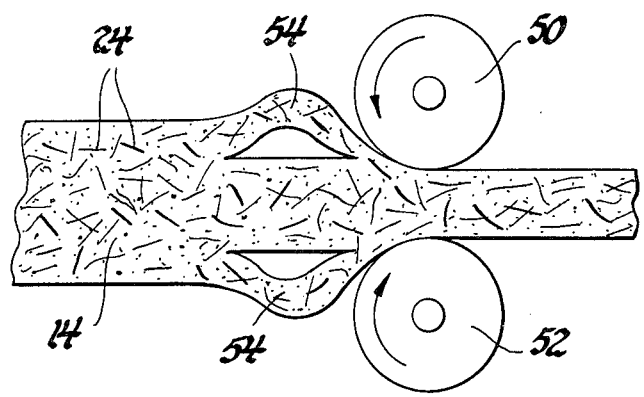
FIG. 4 is a sectional view of a rolling apparatus showing the adverse effect of decreasing the thickness of an SMC slab by too much on a single pass.

As seen in Table II, the distance between calender rollers was reduced only slightly between passes. FIG. 4 illustrates the adverse effects of decreasing the distance between calender rollers 50 and 52 (rotating synchronously in the directions indicated by the arrows) too rapidly. The SMC resin 14 tends to back up behind the rollers and form wings 54 which delaminate from the main body of the resin. As will be discussed hereafter, the thirty reduction steps listed in Table II are not all necessary to achieve the desired results. Substantially fewer compacting steps will, in most cases, be sufficient.

For this Example, the spacing between the calender rolls was set at 11.4 millimeters for the initial pass, 2 millimeters less than the 13.4 mm thickness of the feed stock. 18 passes were made in all to achieve a final thickness of 2.4 millimeters. The roll spacing was reduced in progressively smaller increments as the final material thickness was approached. The roll spacing for the last pass was 0.5 mm smaller than the then current thickness of the feed stock. The compaction ratio between the initial thickness of the feed stock and the final thickness was 5.6:1.

This roll compacted sheet was cut into pieces 125×210 millimeters. Three pieces 2.4 mm thick were stacked to form a charge 7.2 mm thick weighing 333 grams. These made up a compression molding charge which was placed into the center of a 230×280 millimeter full positive pressure plaque mold. The mold was mounted in a 890 KN capacity compression press with the molds maintained at a temperature of 150° C. The plaque molding operation was completed by applying 6.9 MPa pressure to the charge for a period of 130 seconds. A control plaque was made from a piece of the maturated SMC which had not been roll compacted.

36 specimen were cut from the test plaque in the direction in which the SMC had been roll compacted and 18 specimen were cut normal to the rolling direction. Specimen were cut from the control plaque in like manner. The specimen were dumbell shaped according to ASTM D1822 (type L). Tensile strength was measured according to ASTM D2289-69 using an MTS model 819 hydraulic testing machine at a test rate of 30 meters per minute.

Results of the tensile tests showed an average tensile strength, in the direction of roll compacting, i.e., the parallel direction, of 71.9 megapascals for the roll compacted specimen. The average tensile strength for the control specimen was 34.0 megapascals. Thus, the roll compacted material showed a 111% increase in strength in the parallel direction. Data for samples cut from the normal direction showed values of 65.4 megapascals for the roll compacted sample vs. 56.8 megapascals for the control, an improvement of about 15 percent. While the roll compacting process does not increase the tensile properties of the SMC as drastically in the normal direction, it clearly affects the anisotropy of the molded plaque. The anisotropy index is defined herein as the average of strength measurements taken in the parallel direction divided by the average strength measurements taken in the normal direction. The anisotropy index was approximately 0.6 for the control plaque and 1.11 for the compacted sample, where a value of 1 would indicate that a molded sheet was perfectly isotropic. Thus the roll compacted material exhibited much more isotropic strength properties.

EXAMPLE 2

A maturated SMC workpiece was roll compacted and molded as in Example 1 using SMC compound B, the formulation of which is set out in Table III. The SMC material was 4 days old at the time of roll compacting, and a total of 17 passes through the laboratory mill rolls was made to achieve a 4:1 compaction ratio from an initial thickness of 13.2 millimeters to a final thickness of 3.3 millimeters.

TABLE III

SMC COMPOSITIONS
SMC COMPOUND B

| Component | Trade Name | Percent |
| --- | --- | --- |
| Polyester | MR 13047[a] | 16.5 |
| Polyester | MR 17089[a] | 1.4 |
| Low Profile Additive | LP4515-4[a] | 9.4 |
| Low Profile Additive | LP-85[a] | 1.4 |
| Catalyst | t-Butyl Perbenzoate | 0.2 |
| Catalyst | t-Butyl Peroctoate | 0.1 |
| Viscosity Control | VR-3 | 0.4 |
| Lubricant | Zn Stearate | 0.4 |
| Maturation Agent | Calcium Oxide | 0.4 |
| Filler | Camel White (CaCO$_3$) | 46.8 |
| Glass Fiber - 25 mm ave. length | Owens-Corning Fiberglass 951 | 23.0 |

[a]Sold by USS Chemicals formulated by Union Carbide.

Two 125×210×3.3 millimeter pieces were stacked and charged into the plaque mold described in Example 1. Molding was carried out for both the compacted material and a control sample under the conditions set out in Example 1. Sample plaques were tested with the following results. The average strength in the parallel compacting direction was 65.8 MPa vs. 32.1 MPa for the control, an improvement of 105%; the average strength in the normal direction was 55.2 MPa for the compacted sample vs. 54.7 for the control, the normal strength of the control being slightly higher. The anisotropy index was 0.59 for the control and 1.19 for the roll compacted product.

This SMC composition was also molded into 610×530×3 millimeter plaques in both roll compacted and uncompacted (control) form. The compression charge consisted to two 240×210×3.3 millimeter plies. The molding conditions were 5.5 MPa molding pressure at a mold temperature of 150° C. for a cure time of 90 seconds.

The resulting plaques were sprayed directly with one coat of DuPont 9 26AJ265 black, high gloss, acrylic solution lacquer. Generally, such lacquers are applied over primers to improve smoothness, the direct application of such being a more rigorous measure of substrate smoothness. Distinctness of image (DOI) was measured for the coatings by a method described in U.S. Pat. No. 2,830,490 to Pellagrini. DOI is a measure of the sharpness of a reflected image from a glossy surface. light waves strike the surface and are reflected back, scattering of light occurs. As light scattering increases, DOI decreases. The DOI is quantified by projecting images of various sizes onto the surface. The images are circles with small openings projected from a fluorescent light box at a distance of 10 centimeters above the sample under examination. By assigning a value of 100 to the smallest set of rings and values of 90, 80, 70, etc., to the increasingly larger rings, a rating scale is obtained that can be used to quantitatively evaluate the DOI of a painted surface. A DOI value is defined as the number assigned to the smallest pattern of rings in which all the projected circles and their openings are seen clearly and distinctly.

FIGS. 7a and 7b are bar charts of observed DOI for roll compacted and conventional SMC panels coated with the DuPont lacquer. Roll compaction raised all DOI values to above 80%, most being above 90%. A phosphated steel surface painted with the same paint composition generally exhibits a DOI reading of about 80. The control samples showed equal number of DOI readings at 70 and 90, the majority being at 80. The roll compacted SMC thus exhibited a painted surface finish substantially better than conventional SMC and at least as good as painted steel.

The same plaques were then visually analyzed for the presence of paint flaws manifested as crater-like surface defects. The control plaques (non-compacted SMC) showed 103 paint defects, while the roll compacted plaques showed no such defects. This, in itself, would justify precompacting SMC when it is used to mold show parts which are to be painted. In the past, considerable effort and expense has been expended in repairing such crater paint defects after they occur or in preventing their formation. Before this invention, only such drastic surface treatments as sanding or in-the-mold surface coating were found to be effective in preventing paint pops.

EXAMPLE 3

The roll compacting process was used to prepare the SMC compound set out in Table IV.

TABLE IV

| SMC COMPOSITIONS SMC Compound C | | |
|---|---|---|
| Component | Trade Name | Percent |
| Polyester Resin | OCF E980[a] | 32.0 |
| Catalyst | t-Butyl Perbenzoate | 0.3 |
| Lubricant | Zinc Stearate | 0.8 |
| Maturation Agent | MgO | 0.5 |
| Filler | Camel White (CaCO$_3$) | 16.0 |
| Fiberglass - 25 mm ave. length | Owens-Corning Fiberglas 433 | 50.4 |

[a]Sold by Owens-Corning Fiberlgas

The SMC workpiece had an initial thickness of 2.5 millimeters and a high glass loading of 50 weight percent. Roll compacting was stopped at a compaction ratio of 2.3:1 after 13 passes because this highly filled material was difficult to process on the laboratory roller mill described in Example 1.

The compacted material was molded into plaques according to the procedures outlined in Example 1 above. The resulting plaques, along with control plaques, were cut into sample coupons and tested with the following results. Tensile strength in the direction parallel to roll compacting was 186.9 megapascals for the roll compacted material vs. 141.2 megapascals for the control. The tensile strehgth in the direction normal to the roll compaction was 195.8 megapascals for the roll compacted sample vs. 203.6 megapascals for the control. The anisotropy index was 0.69 for the control and 0.95 for the roll compacted samples. Accordingly, these samples showed substantial improvement in strength in the parallel direction and reduction of anisotropy. We believe further improvements would occur if the roll compaction process were carried out to a 4:1 or greater compaction ratio.

Moreover, due to the high glass loading and abbreviated compacting process, the surface appearance of the 50% glass samples was not as drastically improved by roll compacting as was that of the 25% glass samples of Examples 1 and 2. We have observed generally that plaques molded from Roll Compacted SMC have a very uniform surface appearance as far as color is concerned. Plaques molded from conventional SMC generally have a highly mottled appearance.

EXAMPLE 4

Example 1 showed that the strength of an SMC sample was increased by a factor of 2 in the parallel or rolling direction while the strength in the normal direction was improved by only 15%. In this example, roll compacting was performed in both the parallel and normal directions. The SMC used was the USS/Union Carbide formulation of Example 2. The feed stock for the roll compaction was a laminate of two plies of the compound, each 76×76×6.5 mm in size.

The mill described in Example 1 was used, and in the first phase of the procedure 18 passes were made through the mill with the mill spacing being reduced by 0.6 mm after each pass. This reduced the thickness of the sheet from about 13 mm to 3.3 mm. It was then rolled again in a direction normal to the original roll compaction. Eight additional passes were made through the mill, four with the roller spacing being reduced by 0.3 mm after each pass and four with the roller spacing reduced by 0.13 mm after each pass. The final material thickness was 1.6 mm yielding a total compaction ratio of approximately 8:1.

Test plaques were prepared from the multidirectionally rolled material and from untreated SMC from the same batch, and tensile samples were prepared as described in Example 1. Their strengths were measured, the control having measured parallel strength of 37.8 MPa and normal strength of 55.5 MPa. The roll compacted plaque exhibited a parallel strength of 84.1 MPa, an increase of 120%, and a normal strength of 71.9 MPa, an increase of about 30%. The anisotropy index for the control was 0.68 while that of the multidirectionally rolled SMC was 1.17.

EXAMPLE 5

A study was initiated to determine the effect of compaction ratio, i.e., the ratio of the initial thickness of an SMC sheet (about 13.2 mm) to its thickness after roll compacting, on the strength and surface characteristics of samples compression molded therefrom. Referring to FIG. 5, a Weibull statistical procedure was used to compare the strength distributions of a number of roll compacted samples of the Union Carbide SMC composition of Example 2. The natural log of the probability of survival of the sample under test conditions was plotted as a function of the natural log of the sample strength. The legend on FIG. 5 shows the relative compaction ratios of the samples for which Weibull statistical analyses were conducted.

Roll compacting a sample originally 13.2 mm thick to a 2:1 compaction ratio did not appear to appreciably improve the strength characteristics of the material. improvement was noted at the 4:1 compaction ratio and all higher compaction ratios. The closeness and overlapping of Weibull plots for the 6:1, 8:1, and 12:1 compaction ratios indicate that roll compacting SMC to compaction ratios greater that 4:1 neither degrades the strength properties nor appreciably improves them either. Therefore, the preferred compaction ratios range probably lies somewhere between about 2:1 and 6:1 for SMC orginally about 13 mm thick. Much thicker samples of SMC or bulk molding compound (BMC) could be initially rolled to this or other workable thickness and then be roll compacted as taught herein.

Referring now to FIG. 6, distinctness of image is plotted as a function of compaction ratio of 13.2 mm thick slabs of the SMC composition of Example 2. The data points indicated by circles relate to compression molded panels where the initial charge covered an area of 40% of the total plaque mold area. The square data points were taken on panels where the mold charge initially covered only 20% of the plaque mold area. The lower the charge cover area, the greater the flow of the material in the mold must be to fill it out.

The sample panels were covered with the black DuPont acrylic lacquer (926AJ265) of Example 2 over a primer. For both the 20% and 40% charge covered, optimum DOI was experienced at about a 6:1 compaction ratio. For some undetermined reason, this one batch of samples exhibited exceptionally low overall DOI values although to the best of our knowledge the trend of the data in FIG. 6 is accurate.

EXAMPLE 6

Photomicrographic studies were made of the fractured surfaces of roll compacted and control tensile specimen. FIG. 8a shows the fracture surface of a control specimen. The dominant feature of the micrograph is a bundle of fiberglass filaments 90 at the fracture site. FIG. 8b shows the fracture surface of a tensile specimen of a like SMC roll compacted to a 4:1 ratio. The glass filaments 92 of FIG. 8b are not in bundles, but appear to be substantially separate from one another. In order for the filaments to separate, the bonds between them due to the presence of the starch or other binder medium must be broken down. We believe that this breaking up of the fiberglass bundles in the SMC is brought about by roll compaction and accounts at least in part for the improved strength and surface characteristics of the articles molded therefrom.

FIG. 9a shows the fracture surface of a control sample, at about 4 times higher magnification than FIG. 8a. Again, a fiberglass filament bundle 90 is the most striking feature of the photograph. FIG. 9b shows the roll compacted sample of 8b at higher magnification. The most significant feature evident from the higher magnification is the adherence of tiny droplets of resin 94 to discrete fiber filaments 92. This resin adherence indicates that the roll compacting process also brings about better wetting of the fibrous filler by the resin. This too would contribute substantially to increasing the strength of SMC articles compression molded from roll compacted mold charges.

While fiberglass fillers are most common in polyester molding compositions, we believe that the effect of other geometric reinforcing fillers in SMC and other relatively high viscosity polymer media would be improved by the subject compacting process. By a "geometric filler" we mean a particulate reinforcing material that will orient in a preferred direction when subject to flow in a fluid medium. Suitable filler particle shapes would include fibers, flakes and platelets and exclude uniform glass spheres, for example. Readily available geometric fillers might include graphite fibers, natural fibers, mineral fibers, glass flake, metal flake, fibrous talcs, platey talcs, etc.

The advantages of roll compacting documented in the previous Examples appear to be brought at least in part by the shear stress that the roll compacting process applies to both the viscous resin component and the reinforcing filler. Thus, all polymer systems with suitable viscosities and geometric fillers should respond in like manner to our compacting method. For example, bulk molding compound could be flattened into sheet form and then roll compacted in accordance with the practices set forth herein to achieve physical properties in articles molded from it comparable to those of SMC. The initial thickness of a sheet should be such that reducing its thickness by roll compacting or other mechanical means will exert a working force on the geometric filler throughout the viscous polymeric medium. If the initial polymer viscosity is high enough, it may be possible to start with sheets an inch or more in thickness.

The examples report work conducted on a laboratory rolling apparatus with relatively small (20.3 cm) diameter rollers. We believe that we may be able to greatly reduce the required number of rolling steps, and possibly require only one rolling step, by increasing the diameter of the rollers Obviously, many factors such as roller size, polymer viscosity, filler content, initial workpiece thickness, etc. influence the results of a given roll compacting regimen, but optimizing the compacting conditions would be well within the skill of the art in light of the subject disclosure.

Figure 3:
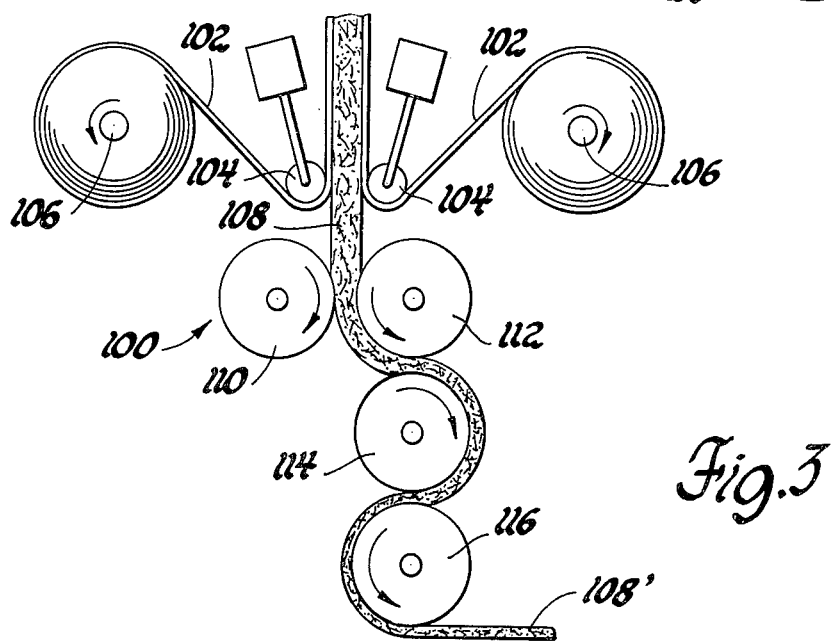
FIG. 3 is a schematic view of a rolling apparatus that could be used to carry out the method of the subject invention.

FIG. 3 schematically depicts a rolling apparatus 100 that could be used to work SMC in accordance with the subject invention. A roll of maturated SMC (not shown) would be unwound and fed between a pair of tensioning rollers. The polyethylene cover sheets 102 are then directed around tensioning rollers 104 and wound up on take up rolls 106. The stripped SMC 108 would then be fed between a pair of calender rollers 110 and 112 where its thickness would be initially reduced. The amount of reduction achievable in a single step appears to be a function of the diameter of the rollers and the rate of rolling. The thickness of sheet 108 would be further reduced between the right hand calender roll 112 and driven compacting roller 114 and then between compacting roller 114 and finishing roller 116, the SMC following a serpentine path through the compacting apparatus. After compacting, the roll compacted SMC 108' would be drawn into a slitter, cutter or other such device preparatory to molding or be stored on rolls for later use. Care should be taken in the compacting process and before molding to prevent loss of volatile constituents from the SMC. Clearly, other roll compacting or compacting devices would be equally suited to the practice of the invention.

In summary, we have discovered a method of treating conventional viscous polymers containing reinforcing fillers to make stronger compression molded articles having very good surface properties. We have found that substantially reducing the thickness of a sheet of such material by mechanical working serves to distribute geometric filler materials more uniformly throughout the polymer and to wet the filler with it. When such compacted materials are formed by conventional compression molding, the resulting parts show significant increase in tensile strength, often at least double in the direction of compacting. They also exhibit an average 10 to 20 point increase in measured distinctness of image and a virtual elimination of microporosity near the surface. These compacted molding compounds can be used to make painted parts without paint pops and craters. This invention provides, in particular, a method of molding isotropic high strength structural parts from SMC or comparable molding compounds which are adapted to receive high gloss paints without radical surface preparation.

While our invention has been described in terms of specific embodiments thereof, other forms may be readily adapted by one skilled in the art. Accordingly, our invention is to be limited only by the following claims.

The embodiments of the invention in which an exclusive property or privilege is claimed are defined as follows:

1. A method of treating maturated sheet molding compound containing short lengths of fiberglass filament bundles to substantially improve the physical properties of an article compression molded therefrom comprising passing a sheet of said sheet molding compound between spaced apart calender rollers to reduce its thickness until the roller compaction causes a substantial portion of the filaments of the fiberglass bundles to break apart and disperse uniformly throughout the compound, said roll compacting producing a substantial increase in tensile strength and decrease in surface defects in an article compression molded therefrom as compared to a like article molded in like manner from a like composition that is not so treated.

2. A method of precompacting a viscous thermosetting molding compound having chopped fiberglass filament bundles dispersed therein, whereby said method the physical properties of an article compression molded from the precompacted compound are substantially improved over those of a like article molded in like manner from a like glass containing compound that is not precompacted, the method comprising: forming a sheet of said compound; rolling said sheet between calender rollers which are spaced apart in rolling relation by a distance that is less than the thickness of the sheets; repeating said rolling step until the thickness of the original sheet is substantially reduced; whereby said rolling process the filaments of the fiberglass bundles are substantially separated from one another and integrated uniformly in the molding compound, the tensile properties and surface finish of an article molded therefrom being substantially improved thereby.

3. A method of precompacting a viscous polymeric molding composition preparatory to compression molding to substantially improve the physical properties of an article molded therefrom said composition being filled with a geometric reinforcing particulate filler and being flowable and thermosettable when compression molded, the method comprising forming a slab of the said filled composition and thereafter forcing it to pass between spaced-apart compression means to substantially reduce its thickness and mechanically work the filler throughout the viscous polymer, whereby said method the tensile strength of a panel compression molded from the compacted composition is substantially higher and more isotropic than that of a like panel molded of a like composition that has not been precompacted, and whereby said method the surface of an article compression molded from the precompacted composition is substantially smoother than that of a like article molded of a like composition that has not been precompacted.

4. A method of compacting a viscous polymeric molding composition preparatory to molding to substantially improve the physical properties of an article molded therefrom, said composition being filled with a geometric reinforcing particulate filler and being flowable and thermosettable when compression molded, the method comprising forming a sheet of the said filled composition and thereafter reducing the thickness of the sheet by forcing it to repeatedly pass between spaced-apart pairs of compression means, the spacing between a said compression means being reduced with respect to the spacing between the means of the preceding pass such that the thickness of the sheet is ultimately reduced to the extent that the filler particles throughout the sheet are worked by passing it between the compression means, whereby said method the tensile strength of a compression molded panel of the compacted composition is measurably higher and substantially more isotropic than that of a like panel molded of a like composition that has not been compacted, and whereby said method the surface of an article compression molded from the compacted composition is substantially smoother than that of a like article molded of a like composition that has not been compacted.

5. A method of molding a fiberglass reinforced structural panel having a substantially nonporous surface adapted to receive a paint coating comprising the steps of providing unmaturated sheet molding compound (SMC) comprised of an unsaturated polyester resin, a monomer in which said resin is soluble and maturation aids;

dispersing in said unmaturated SMC a reinforcing amount of chopped fiberglass bundles;

allowing said SMC to age until it maturates to a pliable putty-like consistency;

rolling said SMC between a pair of cooperative calender rollers spaced apart such that the thickness of the SMC is reduced as it passes therebetween;

continuing said rolling until the thickness of said slab is substantially reduced;

forming suitably sized and shaped mold charges from said rolled SMC;

applying heat and pressure to the rolled SMC charge in a compression mold to crosslink the polyester constituent and form a said structural panel; whereby said roll compacting method the glass fiber bundles are substantially broken apart into filaments and the filaments are uniformly dispersed throughout the molded part to substantially improve its tensile properties.

6. A method of treating maturated sheet molding compound comprised of a crosslinkable polyester resin and a reinforcing amount of chopped fiberglass filament bundles to substantially improve the physical properties of an article compression molded therefrom, the method comprising passing a sheet of said sheet molding compound between spaced apart calender rollers such that the thickness of the sheet is reduced and such that a substantial portion of the filaments of the fiberglass bundles separate from one another and are dispersed uniformly throughout the compound, said roll compacting causing a measurable increase in tensile strength for an article compression molded therefrom as compared to a like article molded of a like untreated composition in like manner.

7. A method of working a viscous polymeric molding composition preparatory to compression molding to substantially improve the physical properties of an article molded therefrom said composition being filled with a geometric reinforcing particulate filler and being flowable and thermosettable when compression molded, the method comprising forming a slab of the said filled composition and thereafter mechanically working the slab to homogeneously distribute the filler particles throughout the viscous polymer, whereby said method the tensile strength of a panel compression molded from the compacted composition is substantially higher and more isotropic than that of a like panel molded of a like composition that has not been preworked and whereby said method the surface of an article compression molded from the preworked composition is substantially smoother than that of a like article molded of a like composition that has not been preworked.

8. An article formed from maturated sheet molding compound reinforced with short lengths of fiberglass filament bundles which compound is passed between spaced apart calendar rollers preparatory to molding to reduce its thickness and cause a substantial portion of the filaments of the fiberglass filler bundles to break apart and disperse uniformly throughout the compound, which article when molded from said roll compacted compound by the application of heat and pressure in a mold exhibits a substantially higher tensile strength and decreased surface defects as compared to a like article molded in like manner from a like compostion that is not so roll compacted.

9. An article which is formed by compression molding maturated polymeric sheet molding compound containing short lengths of fiberglass filament bundles wherein said article the fiberglass bundles are substantially separated into individual filaments homogeneously dispersed throughout the polymer by having mechanically worked the maturated compound preparatory to molding.

10. An article formed from a viscous polymer composition which is flowable and thermosettable when compression molded and which contains a geometric reinforcing particulate filler, wherein said article said filler is uniformly and homogeneously dispersed by having mechanically worked a sheet of the said compound to reduce its thickness preparatory to molding, said article exhibiting higher tensile strength than a like article molded in like manner from a like composition that is not so worked preparatory to molding.

* * * * *